(12) United States Patent
Ren et al.

(10) Patent No.: US 11,057,877 B2
(45) Date of Patent: Jul. 6, 2021

(54) REFERENCE SIGNAL DESIGN FOR NUMEROLOGY AMBIGUITY

(71) Applicant: QUALCOMM Incorporated, San Diego, CA (US)

(72) Inventors: Yuwei Ren, Beijing (CN); Huilin Xu, San Diego, CA (US); Alexandros Manolakos, San Diego, CA (US); Seyedkianoush Hosseini, San Diego, CA (US); Jay Kumar Sundararajan, San Diego, CA (US); Naga Bhushan, San Diego, CA (US); Hung Dinh Ly, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 12 days.

(21) Appl. No.: 16/541,864

(22) Filed: Aug. 15, 2019

(65) Prior Publication Data

US 2020/0059909 A1 Feb. 20, 2020

(30) Foreign Application Priority Data

Aug. 20, 2018 (GR) .............................. 20180100387

(51) Int. Cl.
*H04L 27/26* (2006.01)
*H04L 5/00* (2006.01)
(Continued)

(52) U.S. Cl.
CPC ............. *H04W 72/042* (2013.01); *H04L 1/08* (2013.01); *H04L 27/2607* (2013.01); *H04L 27/2678* (2013.01)

(58) Field of Classification Search
USPC ........................................................ 370/329
See application file for complete search history.

(56) References Cited

U.S. PATENT DOCUMENTS

2018/0049222 A1 2/2018 Manolakos et al.
2018/0131493 A1 5/2018 Luo et al.
(Continued)

OTHER PUBLICATIONS

Huawei et al., "Channel Raster and Synchronization Signal Locations", 3GPP Draft; R1-1608847, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 9, 2016, XP051148901, Retrieved from the Internet: URL:http://www.3gpp.org/ftp/Meetings_3GPP_SYNC/RAN1/Docs/ [retrieved on Oct. 9, 2016], section 2.1, 3 pages.
(Continued)

*Primary Examiner* — Jeffrey M Rutkowski
*Assistant Examiner* — Luna Weissberger
(74) *Attorney, Agent, or Firm* — Harrity & Harrity, LLP

(57) ABSTRACT

Various aspects of the present disclosure generally relate to wireless communication. In some aspects, a transmitter may identify a set of resource elements on which to transmit a reference signal based at least in part on a numerology being used by the transmitter and at least one of a maximum system numerology or a minimum system numerology; and transmit the reference signal on the identified set of resource elements. In some aspects, a receiver may identify a set of resource elements from which to obtain a reference signal based at least in part on a numerology being used by the receiver and at least one of a maximum system numerology or a minimum system numerology; and obtain the reference signal from the identified set of resource elements. Numerous other aspects are provided.

30 Claims, 9 Drawing Sheets

(51) Int. Cl.
*H04W 24/10* (2009.01)
*H04W 72/04* (2009.01)
*H04L 1/08* (2006.01)

(56) References Cited

U.S. PATENT DOCUMENTS

| | | |
|---|---|---|
| 2018/0198579 A1 | 7/2018 | Nammi et al. |
| 2019/0007152 A1* | 1/2019 | Yi .................. H04L 5/0028 |
| 2020/0092065 A1* | 3/2020 | Kuang ............. H04L 5/0053 |
| 2020/0177256 A1 | 6/2020 | Cha et al. |
| 2020/0245395 A1* | 7/2020 | Zhang .............. H04L 5/0053 |

OTHER PUBLICATIONS

International Search Report and Written Opinion—PCT/US2019/046860—ISA/EPO—Oct. 28, 2019.

* cited by examiner

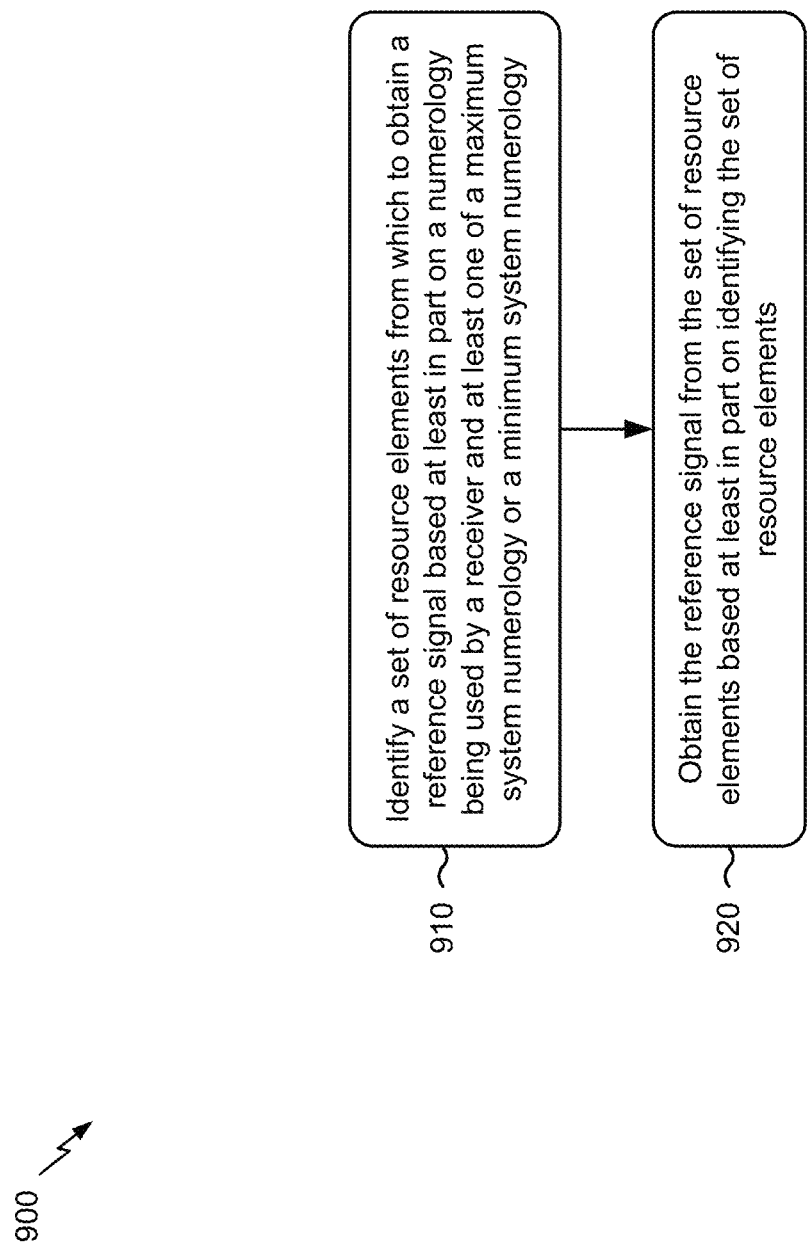

REFERENCE SIGNAL DESIGN FOR NUMEROLOGY AMBIGUITY

CROSS-REFERENCE TO RELATED APPLICATION

This application claims priority to Greek Patent Application No. 20180100387, filed on Aug. 20, 2018, entitled "REFERENCE SIGNAL DESIGN FOR NUMEROLOGY AMBIGUITY," which is hereby expressly incorporated by reference herein.

FIELD OF THE DISCLOSURE

Aspects of the present disclosure generally relate to wireless communication and to techniques and apparatuses for reference signal design for numerology ambiguity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a transmitter, may include identifying a set of resource elements on which to transmit a reference signal based at least in part on a numerology being used by the transmitter and at least one of a maximum system numerology or a minimum system numerology; and transmitting the reference signal on the set of resource elements based at least in part on identifying the set of resource elements.

In some aspects, a transmitter for wireless communication may include memory and one or more processors operatively coupled to the memory. The memory and the one or more processors may be configured to identify a set of resource elements on which to transmit a reference signal based at least in part on a numerology being used by the transmitter and at least one of a maximum system numerology or a minimum system numerology; and transmit the reference signal on the set of resource elements based at least in part on identifying the set of resource elements.

In some aspects, a non-transitory computer-readable medium may store one or more instructions for wireless communication. The one or more instructions, when executed by one or more processors of a transmitter, may cause the one or more processors to identify a set of resource elements on which to transmit a reference signal based at least in part on a numerology being used by the transmitter and at least one of a maximum system numerology or a minimum system numerology; and transmit the reference signal on the set of resource elements based at least in part on identifying the set of resource elements.

In some aspects, an apparatus for wireless communication may include means for identifying a set of resource elements on which to transmit a reference signal based at least in part on a numerology being used by the apparatus and at least one of a maximum system numerology or a minimum system numerology; and means for transmitting the reference signal on the set of resource elements based at least in part on identifying the set of resource elements.

In some aspects, a method of wireless communication, performed by a receiver, may include identifying a set of resource elements from which to obtain a reference signal based at least in part on a numerology being used by the receiver and at least one of a maximum system numerology or a minimum system numerology; and obtaining the reference signal from the set of resource elements based at least in part on identifying the set of resource elements.

In some aspects, a receiver for wireless communication may include memory and one or more processors operatively coupled to the memory. The memory and the one or more processors may be configured to identify a set of resource elements from which to obtain a reference signal based at least in part on a numerology being used by the receiver and at least one of a maximum system numerology or a minimum system numerology; and obtain the reference signal from the set of resource elements based at least in part on identifying the set of resource elements.

In some aspects, a non-transitory computer-readable medium may store one or more instructions for wireless communication. The one or more instructions, when executed by one or more processors of a receiver, may cause the one or more processors to identify a set of resource elements from which to obtain a reference signal based at least in part on a numerology being used by the receiver and at least one of a maximum system numerology or a minimum system numerology; and obtain the reference signal from the set of resource elements based at least in part on identifying the set of resource elements.

In some aspects, an apparatus for wireless communication may include means for identifying a set of resource elements from which to obtain a reference signal based at least in part on a numerology being used by the apparatus and at least one of a maximum system numerology or a minimum system numerology; and means for obtaining the reference signal from the set of resource elements based at least in part on identifying the set of resource elements.

Aspects generally include a method, apparatus, system, computer program product, non-transitory computer-readable medium, user equipment, base station, transmitter, receiver, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8-9 are diagrams illustrating example processes relating to reference signal design for numerology ambiguity, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
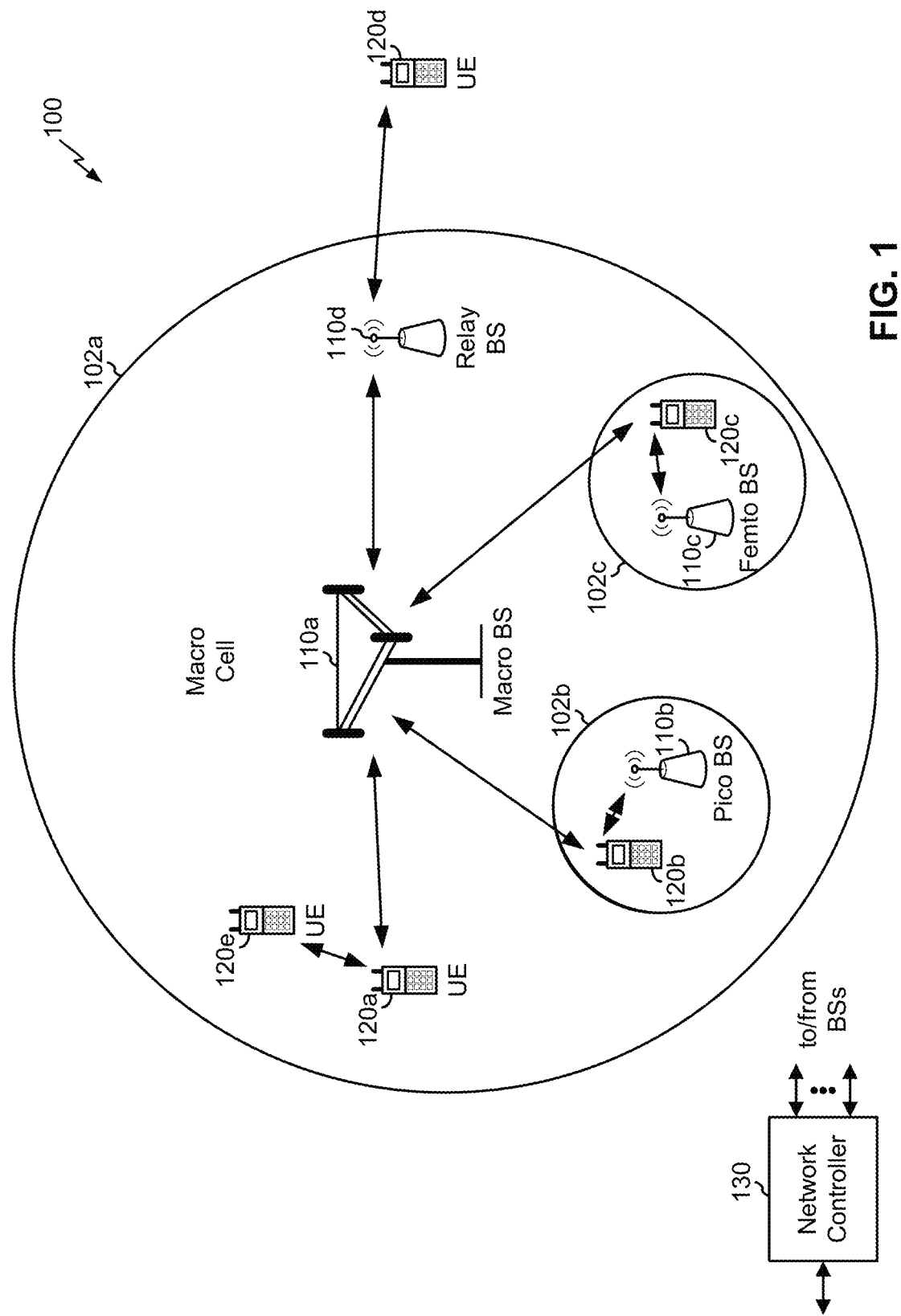
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
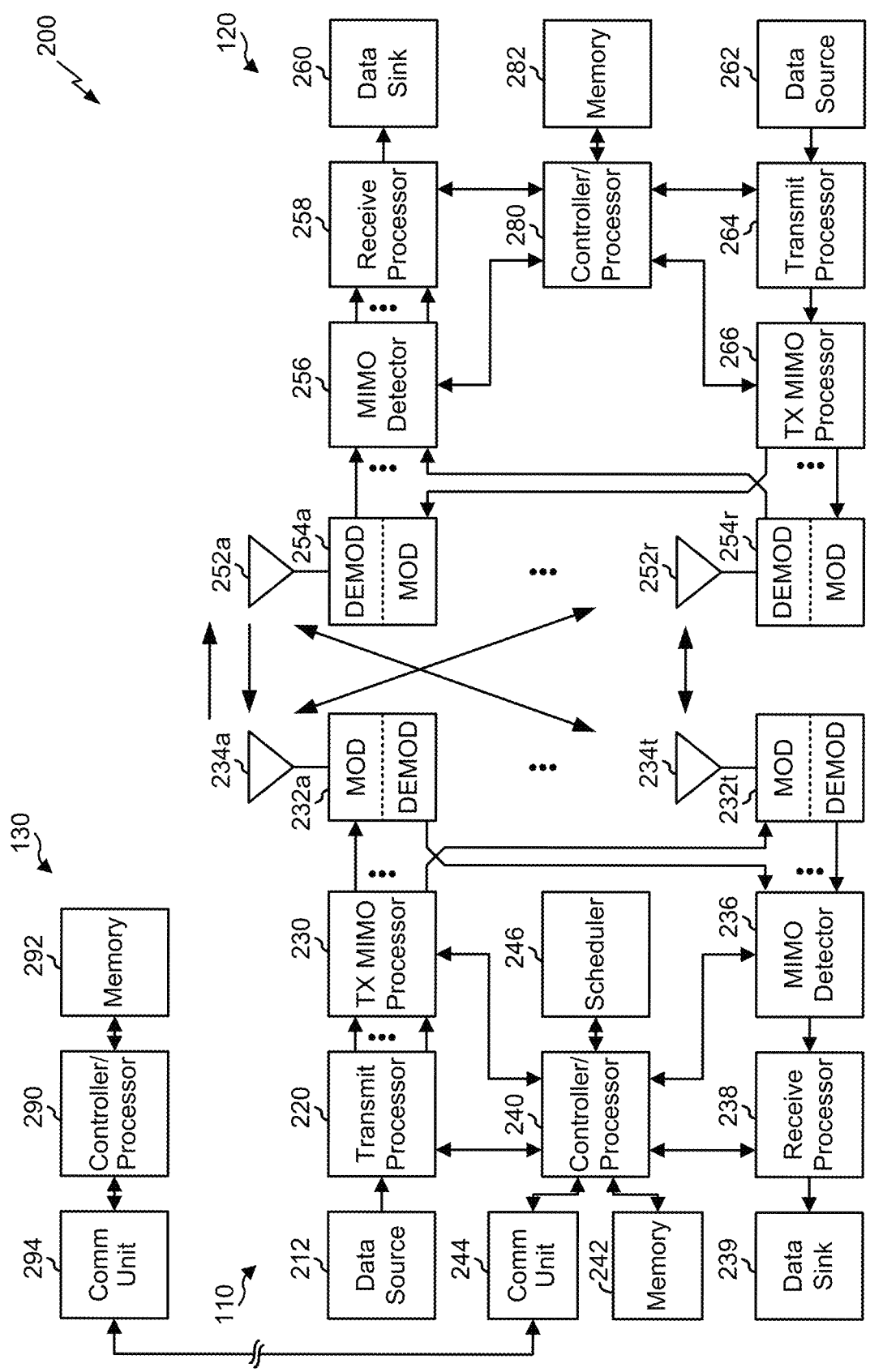
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal design for numerology ambiguity, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a transmitter (e.g., base station 110, UE 120, and/or the like) may include means for identifying a set of resource elements on which to transmit a reference signal based at least in part on a numerology being used by the transmitter and at least one of a maximum system numerology or a minimum system numerology; means for transmitting the reference signal on the set of resource elements based at least in part on identifying the set of resource elements; and/or the like. Additionally, or alternatively, a receiver (e.g., base station 110, UE 120, and/or the like) may include means for identifying a set of resource elements from which to obtain a reference signal based at least in part on a numerology being used by the receiver and at least one of a maximum system numerology or a minimum system numerology; means for obtaining the reference signal from the set of resource elements based at least in part on identifying the set of resource elements; and/or the like. In some aspects, such means may include one or more components of base station 110 and/or UE 120 described in connection with FIG. 2.

As indicated above, FIG. 2 is provided merely as an example. Other examples may differ from what is described with regard to FIG. 2.

Figure 3:
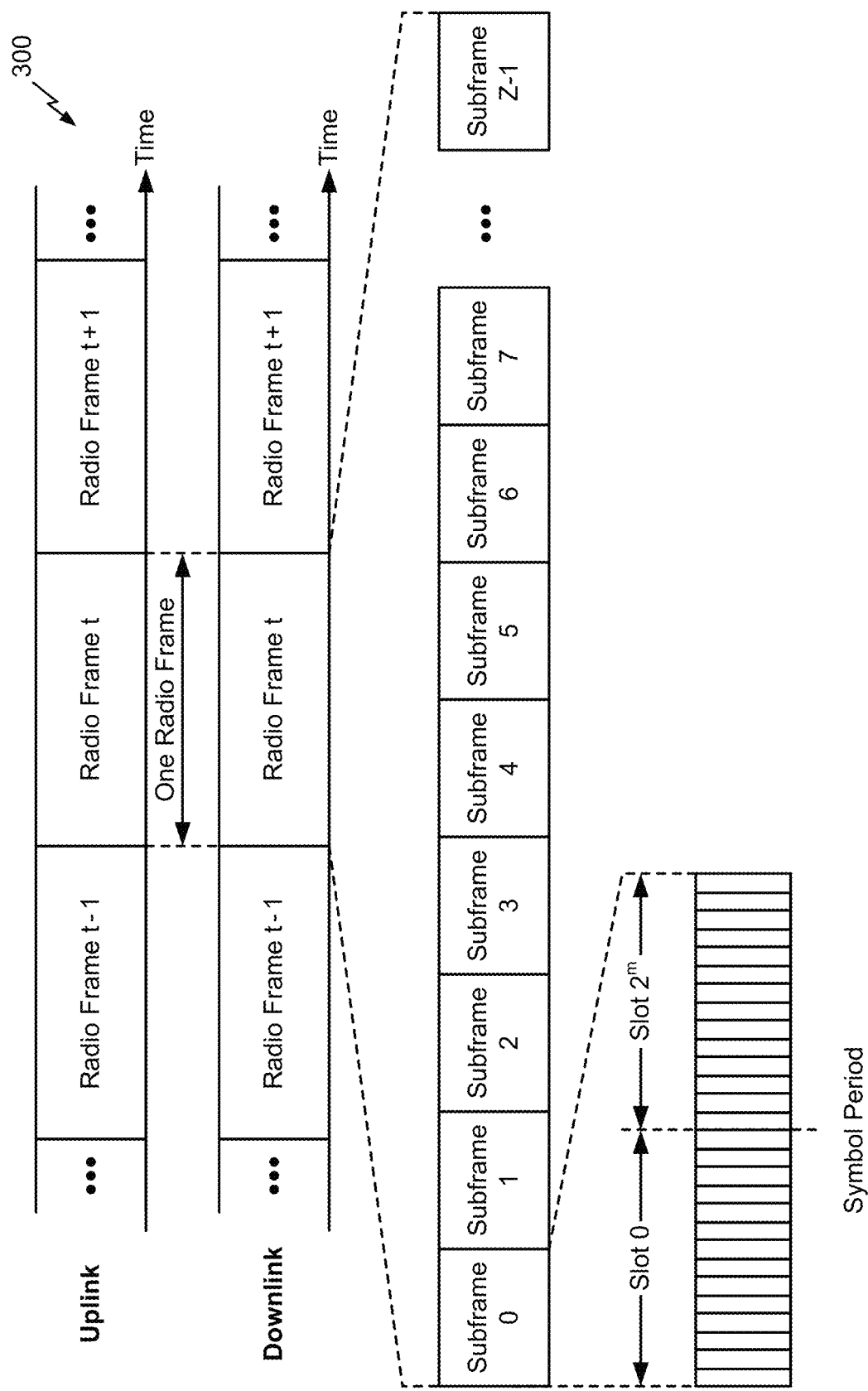
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2m slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

As indicated above, FIG. 3 is provided as an example. Other examples may differ from what is described with regard to FIG. 3.

Figure 4:
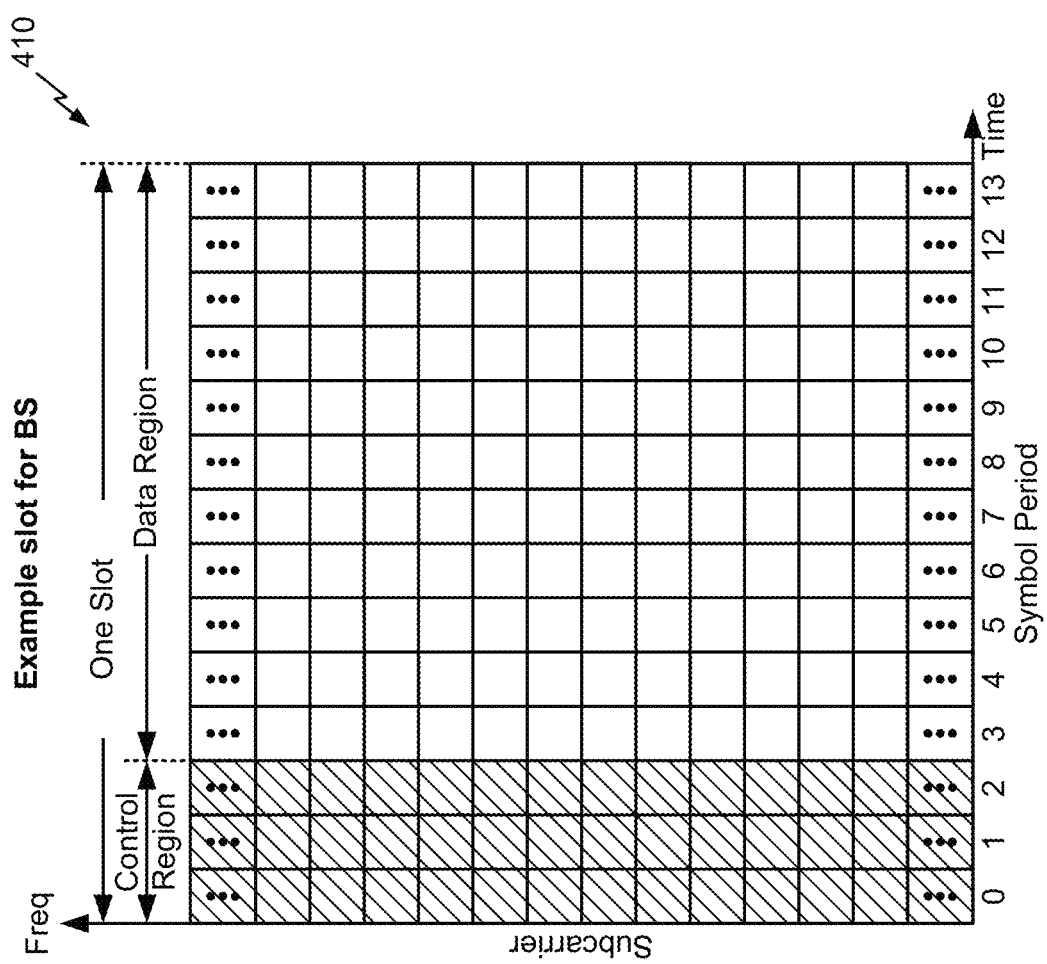
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 4 is provided as an example. Other examples may differ from what is described with regard to FIG. 4.

A transmitter (e.g., a base station 110, a UE 120, and/or the like) may transmit a reference signal to a receiver (e.g., a base station 110, a UE 120, and/or the like) to communicate some information. The reference signal may be a signal known to both the transmitter and the receiver, and may include, for example, a known preamble, a known sequence, a known value, a known waveform, and/or the like. In some cases, the transmitter and/or the receiver may be capable of communicating using multiple different numerologies, such as multiple different subcarrier spacings and/or multiple different cyclic prefixes. For example, a numerology of 15 kHz or 30 kHz may be used for enhanced mobile broadband (eMBB) communications, a numerology of 30 kHz or 60 kHz may be used for ultra-reliable low latency communications (URLLC), a numerology of 15 kHz, 30 kHz, or 60 kHz may be used for sub-6 GHz communications, and/or the like.

In this case, a numerology being used by the transmitter may not be known by or communicated to the receiver prior to reception of a reference signal by the receiver. Furthermore, even if a numerology being used by the transmitter is known by or communicated to the receiver, the numerology being used by the transmitter may change over time and/or frequency (e.g., for different bandwidth parts and/or the like). As a result, when obtaining and/or decoding the reference signal, the receiver may need to test multiple hypotheses (e.g., a blind decoding hypothesis and/or the like), corresponding to the multiple possible numerologies, in order to successfully obtain and/or decode the reference signal. Such testing of multiple hypotheses may be computationally expensive and may require the use of more resources of the receiver (e.g., processing resources, memory resources, battery power, and/or the like) as compared to testing fewer hypotheses or a single hypothesis.

Some techniques and apparatuses described herein permit a reference signal to be designed and/or transmitted such that the receiver need not test multiple hypotheses to obtain the reference signal. For example, the reference signal may be designed and/or transmitted such that the receiver may obtain the reference signal without knowing the numerology being used by the transmitter to transmit the reference signal, even if the transmitter is capable of using multiple numerologies (e.g., a numerology selected from the multiple numerologies) to transmit the reference signal. In this way, resources of the receiver (e.g., processing resources, memory resources, battery power, and/or the like) may be conserved. Additional details are described below.

Figure 5:
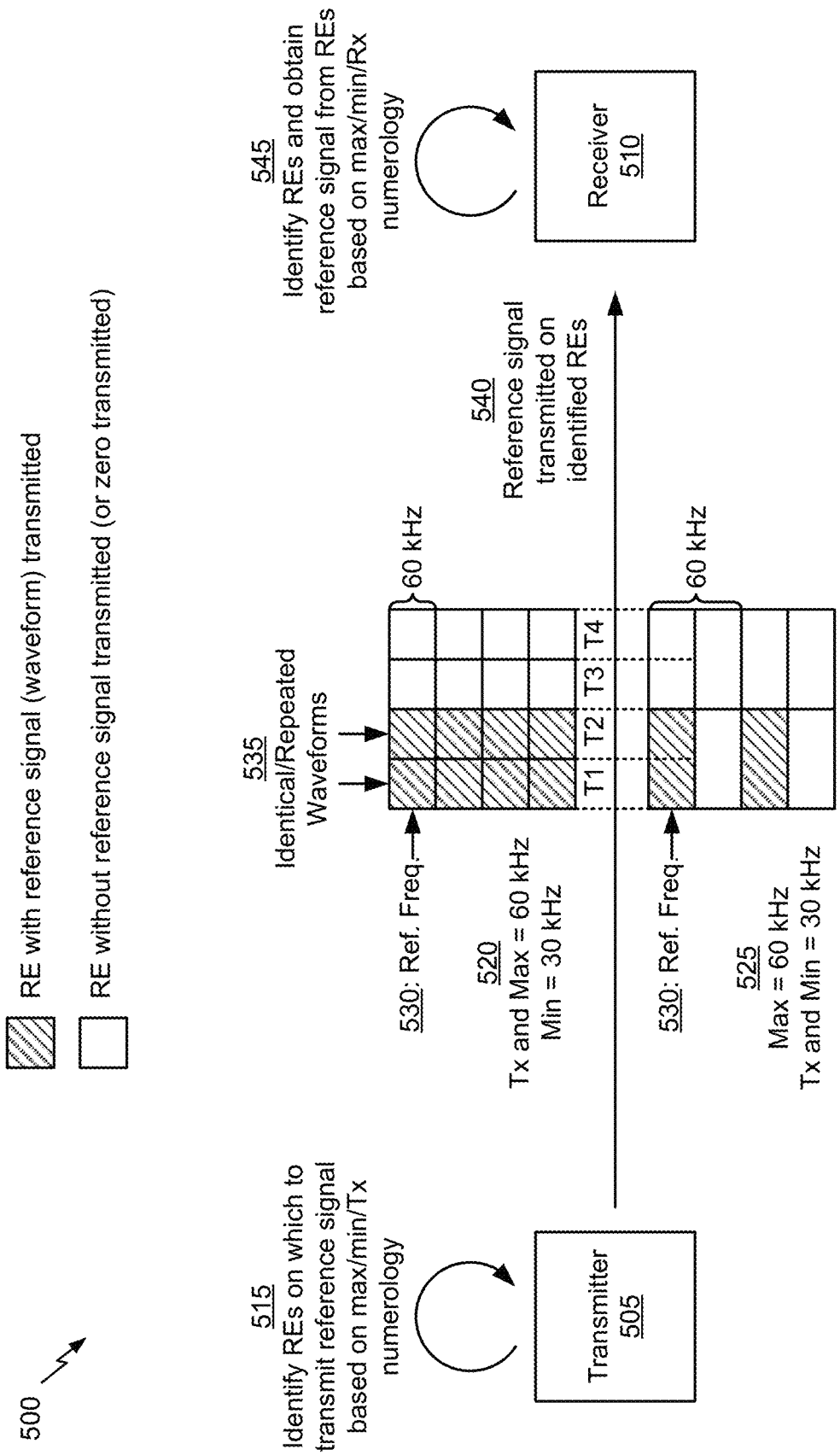
FIGS. 5-7 are diagrams illustrating examples of reference signal design for numerology ambiguity, in accordance with various aspects of the present disclosure.

FIG. 5 is a diagram illustrating an example 500 of reference signal design for numerology ambiguity, in accordance with various aspects of the present disclosure.

As shown in FIG. 5, a transmitter 505 and a receiver 510 may communicate with one another. The transmitter 505 may include, for example, a base station 110, a UE 120, and/or the like. Similarly, the receiver 510 may include, for example, a base station 110, a UE 120, and/or the like. The transmitter 505 and/or the receiver 510 may be capable of communicating using multiple numerologies. For example, the transmitter 505 may transmit signals using a numerology selected from multiple numerologies. Similarly, the receiver 510 may receive signals using a numerology selected from multiple numerologies. Different numerologies may correspond to different subcarrier spacings (e.g., 15 kHz, 30 kHz, 60 kHz, and/or the like).

The transmitter 505 may transmit a reference signal to the receiver 510. The reference signal may be a signal known to both the transmitter 505 and the receiver 510, and may include, for example, a known preamble, a known sequence, a known value, a known waveform, and/or the like. For example, the reference signal may include a demodulation reference signal (DMRS), a channel state information reference signal (CSI-RS), a phase tracking reference signal (PTRS), a sounding reference signal (SRS), a cell-specific reference signal (CRS), a primary synchronization signal (PSS), a secondary synchronization signal (SSS), one or more signals of a synchronization signal block (SSB), and/or the like.

As shown by reference number 515, the transmitter 505 may identify a set of resource elements on which to transmit the reference signal. In some aspects, the transmitter 505 may identify the set of resource elements based at least in part on a numerology being used by the transmitter 505 (shown as Tx), a maximum system numerology (shown as max), and/or a minimum system numerology (shown as min). In some aspects, the transmitter 505 may identify the set of resource elements based at least in part on the numerology being used by the transmitter 505 and at least one of the maximum system numerology (e.g., the maximum system numerology or a multiple of the maximum system numerology) or the minimum system numerology (e.g., the minimum system numerology or a fraction of the minimum system numerology). In some aspects, the transmitter 505 may identify the set of resource elements based at least in part on the numerology being used by the transmitter 505 and both of the maximum system numerology and the minimum system numerology.

A numerology being used by the transmitter 505 (sometimes referred to herein as a transmitter numerology) may refer to a numerology with which the transmitter 505 is currently configured at the time that the reference signal is to be transmitted. For example, the numerology being used by the transmitter 505 may be a numerology being used for one or more communications with one or more receivers 510 (e.g., the receiver 510 shown in FIG. 5 and/or one or more other receivers 510). In some aspects, the numerology being used by the transmitter 505 may depend on a communication mode with which the transmitter 505 is operating, such as a sub-6 GHz mode (e.g., which may use, for example, 60 kHz, 30 kHz, or 15 kHz subcarrier spacings), an eMBB mode (e.g., which may use, for example, 30 kHz or 15 kHz subcarrier spacings), a URLLC mode (e.g., which may use, for example, 60 kHz or 30 kHz subcarrier spacings), and/or the like.

A maximum system numerology may refer to a maximum numerology (e.g., corresponding to a highest subcarrier spacing) supported by the transmitter 505 and/or the receiver 510 (e.g., a maximum numerology with which the transmitter 505 and/or the receiver 510 is capable of being configured). Additionally, or alternatively, the maximum system numerology may refer to a maximum numerology supported by a wireless communication system in which the transmitter 505 and/or the receiver 510 is operating. Additionally, or alternatively, the maximum system numerology may refer to a maximum numerology supported by a communication mode (e.g., a sub-6 GHz mode, an eMBB mode, a URLLC mode, and/or the like) with which the transmitter 505 and/or the receiver 510 is operating. As an example, a maximum system numerology for sub-6 GHz communications may be 60 kHz, a maximum system numerology for eMBB communications may be 30 kHz, and/or a maximum system numerology for URLLC communications may be 60 kHz. These maximum numerologies and communication modes are provided as examples, and other examples are contemplated. As an example, if the maximum system numerology is 60 kHz, then a multiple of the maximum system numerology may refer to 60 kHz×N, where N is a positive integer.

Similarly, a minimum system numerology may refer to a minimum numerology (e.g., corresponding to a lowest subcarrier spacing) supported by the transmitter 505 and/or the receiver 510 (e.g., a minimum numerology with which the transmitter 505 and/or the receiver 510 is capable of being configured). Additionally, or alternatively, the minimum system numerology may refer to a minimum numerology supported by a wireless communication system in which the transmitter 505 and/or the receiver 510 is operating. Additionally, or alternatively, the minimum system numerology may refer to a minimum numerology supported by a communication mode (e.g., a sub-6 GHz mode, an eMBB mode, a URLLC mode, and/or the like) with which the transmitter 505 and/or the receiver 510 is operating. As an example, a minimum system numerology for sub-6 GHz communications may be 15 kHz, a minimum system numerology for eMBB communications may be 15 kHz, and/or a minimum system numerology for URLLC communications may be 30 kHz. These minimum numerologies and communication modes are provided as examples, and other examples are contemplated. As an example, if the minimum system numerology is 15 kHz, then a fraction of the minimum system numerology may refer to 15 kHz/N, where N is a positive integer.

As shown by reference number 520, as an example, the numerology being used by the transmitter 505 may be the same as (e.g., equal to) a maximum system numerology of 60 kHz. A minimum system numerology may be 30 kHz. This may be the case, for example, for URLLC communications. As further shown, in the case where the numerology being used by the transmitter 505 is the same as the maximum system numerology, the transmitter 505 may transmit the reference signal on all subcarriers of one or more symbols in which the reference signal is to be transmitted. In the example of reference number 520, four subcarriers are shown per symbol, and the transmitter 505 transmits the reference signal on all four subcarriers. This is shown as an example only, and the actual number of subcarriers per symbol may be different than shown.

Additionally, or alternatively, when the numerology being used by the transmitter 505 is the same as the maximum system numerology, the transmitter 505 may transmit the reference signal on more subcarriers per symbol than when the numerology being used by the transmitter 505 is not the same as the maximum system numerology. Accordingly, the reference signal pattern may be denser in the frequency domain for a higher numerology (e.g., the reference signal may occupy a larger percentage of available resource elements per symbol), and may be sparser in the frequency domain for a lower numerology (e.g., the reference signal may occupy a smaller percentage of available resource elements per symbol).

As shown by reference number 525, as another example, a maximum system numerology may be 60 kHz, and the numerology being used by the transmitter may be the same as (e.g., equal to) a minimum system numerology of 30 kHz. This may be the case, for example, for URLLC communications. As further shown, in the case where the numerology being used by the transmitter 505 is different from (e.g., is lower than) the maximum system numerology, the transmitter 505 may transmit the reference signal on fewer than all subcarriers of one or more symbols in which the reference signal is to be transmitted. In the example of reference number 525, four subcarriers are shown per symbol, and the transmitter 505 transmits the reference signal on two of the four subcarriers (e.g., every other subcarrier). This is shown as an example only, and the actual number of subcarriers per symbol may be different than shown.

Additionally, or alternatively, when the numerology being used by the transmitter 505 is different from the maximum system numerology, the transmitter 505 may transmit the reference signal on fewer subcarriers per symbol than when the numerology being used by the transmitter 505 is the same as the maximum system numerology. In general, the transmitter 505 may transmit the reference signal on more subcarriers per symbol for higher numerologies (e.g., the maximum system numerology or a multiple of the maximum system numerology), and may transmit the reference signal on fewer subcarriers per symbol for lower numerologies (e.g., the minimum system numerology or a fraction of the minimum system numerology).

In some aspects, the transmitter 505 may identify the resource elements to be used for transmission of the reference signal based at least in part on a relationship between (and/or a comparison between) the numerology being used by the transmitter 505 (sometimes referred to below as a transmitter numerology) and the maximum system numerology. Additionally, or alternatively, the transmitter 505 may determine the subcarriers to be used for transmission of the reference signal based at least in part on the relationship. For example, the transmitter 505 may transmit the reference signal on all subcarriers of a symbol if the transmitter numerology is equal to the maximum system numerology, may transmit the reference signal on every other subcarrier of a symbol if the transmitter numerology is one half of the maximum system numerology, may transmit the reference signal on every fourth subcarrier of a symbol if the transmitter numerology is one quarter of the maximum system numerology, and so on. In some aspects, the transmitter 505 may transmit the reference signal on every $n^{th}$ subcarrier of a symbol, where n is equal to the maximum system numerology divided by the transmitter numerology.

As shown by reference number 530, in some aspects, the set of resource elements (e.g. the set of subcarriers) may be identified based at least in part on a reference frequency that is identical across all system numerologies. The reference frequency may be used so that the receiver 510 can obtain the reference signal regardless of a numerology used by the transmitter 505 to transmit the reference signal. Because some subcarriers will not be used to transmit the reference signal in some numerologies (or a zero signal will be transmitted for the reference signal in some subcarriers in some numerologies), the reference frequency may be used to identify the subcarriers in which the reference signal is to be transmitted (e.g., by the transmitter 505) and the subcarriers from which the reference signals can be obtained (e.g., by the receiver 510). These subcarriers will be the same due to the use of the reference frequency.

As shown in example 500, in some aspects, the reference signal is always transmitted in the subcarrier corresponding to the reference frequency (e.g., a sequence of the reference signal may start at the reference frequency), and the other subcarriers to be used to transmit the reference signal may be determined using the reference frequency and, for example, the relationship between the transmitter numerology and the maximum system numerology.

As shown by reference number 535, in some aspects, the overall waveform of the reference signal is identical across all system numerologies. To achieve this property, in some aspects, the overall waveform of the reference signal may include multiple repetitions of the same waveform. In some aspects, the number of repetitions may depend on a number of possible system numerologies. For example, the number of repetitions may be equal to $2^{(m-1)}$, where m is equal to the number of possible numerologies. Thus, two repeated waveforms may be used for two possible numerologies, four repeated waveforms may be used for three possible numerologies, and so on.

In example 500, there are two possible system numerologies of 60 kHz and 30 kHz. Thus, the reference signal is composed of two repetitions of the same waveform. When the transmitter numerology is the same as the maximum system numerology (e.g., 60 kHz, as shown by reference number 520), each repetition of the waveform spans a single symbol, and the reference signal spans two total symbols. When the transmitter numerology is the same as the minimum system numerology (e.g., 30 kHz, as shown by reference number 525), both repetitions of the waveform are included in a single symbol (e.g., due to different symbol lengths corresponding to different numerologies having different subcarrier spacings). As a result, the receiver 510 can obtain the reference signal regardless of a numerology used by the transmitter 505, without knowing the numerology used by the transmitter 505, and without testing multiple numerology hypotheses.

Thus, in some aspects, the transmitter 505 may identify the resource elements to be used for transmission of the reference signal based at least in part on a relationship between (and/or a comparison between) the transmitter numerology and the minimum system numerology. Additionally, or alternatively, the transmitter 505 may determine the number of symbols to be used for transmission of the reference signal based at least in part on the relationship. For example, the transmitter 505 may transmit the reference signal on a number of symbols equal to the transmitter numerology divided by the minimum system numerology. The number of symbols may be consecutive, as shown.

Although not shown, in some aspects, the reference signal may include a cyclic prefix. In some aspects, different numerologies may correspond to different cyclic prefixes (e.g., different cyclic prefix lengths and/or the like). If the reference signal includes a cyclic prefix, then a waveform duration of the cyclic prefix may be identical across all system numerologies. As a result, the cyclic prefix may span a different number of symbols in different numerologies (e.g., because the symbol length may differ for different numerologies), in a similar manner as described above. In this way, the receiver 510 can obtain a reference signal that includes a cyclic prefix regardless of a numerology used by the transmitter 505, without knowing the numerology used by the transmitter 505, and without testing multiple numerology hypotheses.

As shown by reference number 540, the transmitter 505 may transmit the reference signal (e.g., to the receiver 510) on the identified set of resource elements. The receiver 510 may identify the resource elements to be used to obtain the reference signal in a similar manner as described above in connection with the transmitter 505 identifying the resource elements to be used to transmit the reference signal.

For example, as shown by reference number 545, the receiver 510 may identify the set of resource elements from which to obtain the reference signal based at least in part on a numerology being used by the receiver 510 (shown as Rx), a maximum system numerology (e.g., the maximum system numerology or a multiple of the maximum system numerology), and/or a minimum system numerology (e.g., the minimum system numerology or a fraction of the minimum system numerology). In some aspects, the receiver 510 may identify the set of resource elements based at least in part on the numerology being used by the receiver 510 and at least one of the maximum system numerology or the minimum system numerology. In some aspects, the receiver 510 may identify the set of resource elements based at least in part on the numerology being used by the receiver 510 and both of the maximum system numerology and the minimum system numerology.

A numerology being used by the receiver 510 (sometimes referred to herein as a receiver numerology) may refer to a numerology with which the receiver 510 is currently configured at the time that the reference signal is to be obtained. For example, the receiver numerology may be a numerology being used for one or more communications with one or more transmitters 505 (e.g., the transmitter 505 shown in FIG. 5 and/or one or more other transmitters 505). In some aspects, the receiver numerology may depend on a communication mode with which the receiver 510 is operating, such as a sub-6 GHz mode, an eMBB mode, a URLLC mode, and/or the like.

In a similar manner as described above, in the case where the numerology being used by the receiver 510 is the same as the maximum system numerology, the receiver 510 may obtain the reference signal on all subcarriers of one or more symbols in which the reference signal is to be obtained. Additionally, or alternatively, when the numerology being used by the receiver 510 is the same as the maximum system numerology, the receiver 510 may obtain the reference signal on more subcarriers per symbol than when the numerology being used by the receiver 510 is not the same as the maximum system numerology.

Additionally, or alternatively, in the case where the numerology being used by the receiver 510 is different from (e.g., is lower than) the maximum system numerology, the receiver 510 may obtain the reference signal on fewer than all subcarriers of one or more symbols in which the reference signal is to be obtained. Additionally, or alternatively, when the numerology being used by the receiver 510 is different from the maximum system numerology, the receiver 510 may obtain the reference signal on fewer subcarriers per symbol than when the numerology being used by the receiver 510 is the same as the maximum system numerology. In general, the receiver 510 may obtain the reference signal on more subcarriers per symbol for higher numerologies (e.g., the maximum system numerology or a multiple of the maximum system numerology), and may obtain the reference signal on fewer subcarriers per symbol for lower numerologies (e.g., the minimum system numerology or a fraction of the minimum system numerology).

In a similar manner as described above, in some aspects, the receiver 510 may identify the resource elements (e.g., the subcarriers) to be used to obtain the reference signal based at least in part on a relationship between (and/or a comparison between) the receiver numerology and the maximum system numerology. For example, in some aspects, the receiver 510 may obtain the reference signal on every $n^{th}$ subcarrier of a symbol, where n is equal to the maximum system numerology divided by the receiver numerology. Additionally, or alternatively, the receiver 510 may identify the set of resource elements (e.g. the set of subcarriers) to be used to obtain the reference signal based at least in part on a reference frequency that is identical across all system numerologies.

Additionally, or alternatively, the receiver 510 may identify the resource elements (e.g., the symbols) to be used to obtain the reference signal based at least in part on a relationship between (and/or a comparison between) the receiver numerology and the minimum system numerology. For example, the receiver 510 may obtain the reference signal on a number of symbols equal to the receiver numerology divided by the minimum system numerology.

Once the receiver 510 has identified the set of resource elements to be used to obtain the reference signal, the receiver 510 may obtain the reference signal from the identified resource elements. Due to the design and transmission of the reference signal using the techniques described herein, the receiver 510 may obtain the reference signal without knowing the numerology being used by the transmitter 505 to transmit the reference signal, even if the transmitter 505 and/or the receiver 510 is capable of using multiple numerologies (e.g., a numerology selected from the multiple numerologies) to transmit and/or receive the reference signal. In this way, resources of the receiver 510 (e.g., processing resources, memory resources, battery power, and/or the like) may be conserved because the receiver 510 need not test multiple numerology hypotheses to obtain the reference signal. Furthermore, all configured reference signal (such as remote interference management reference signals (RIM-RS) and/or the like) resources may have the same bandwidth and the same subcarrier spacing.

As indicated above, FIG. 5 is provided as an example. Other examples may differ from what is described with respect to FIG. 5.

Figure 6:
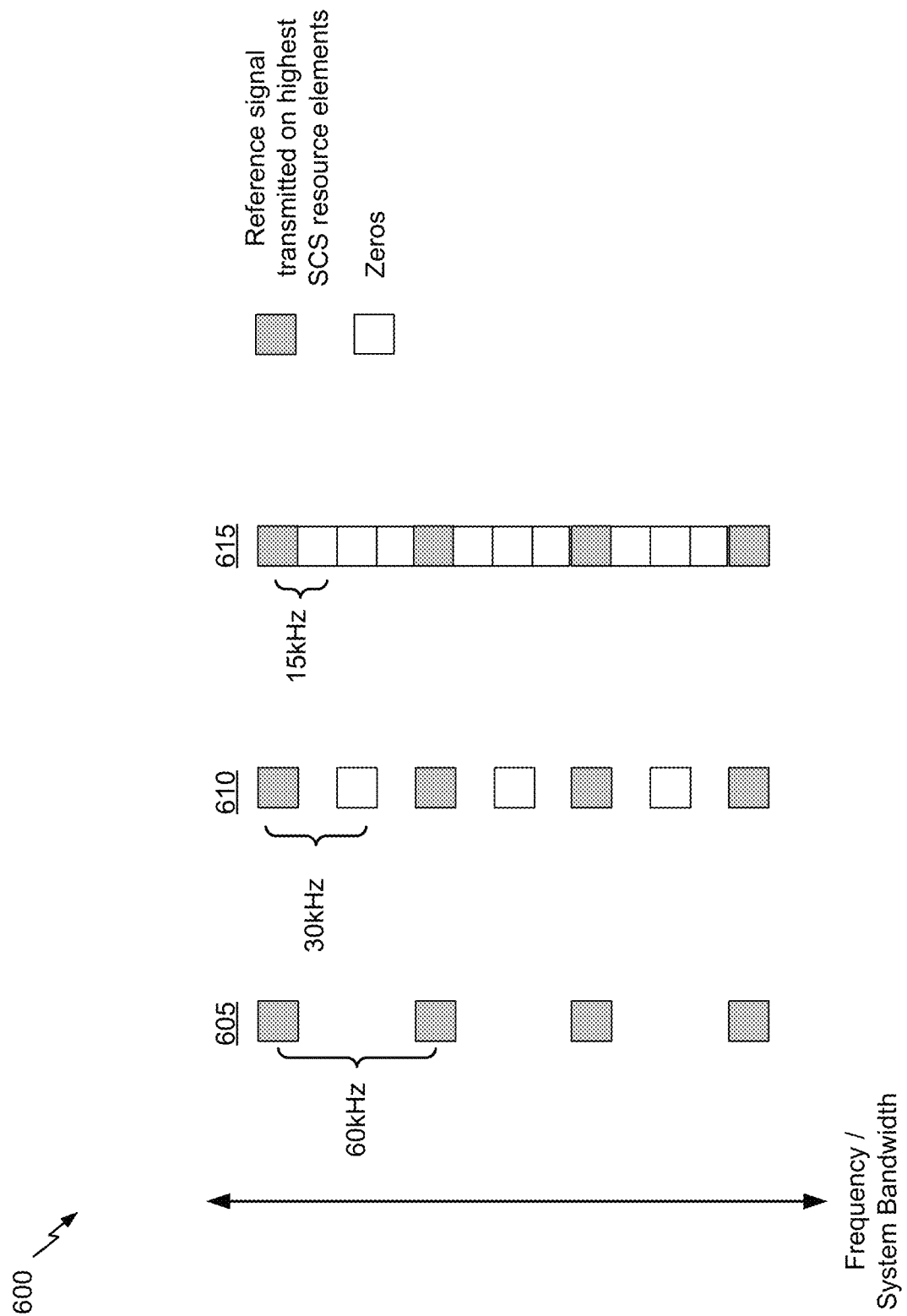

FIG. 6 is a diagram illustrating an example 600 of reference signal design for numerology ambiguity, in accordance with various aspects of the present disclosure.

FIG. 6 shows an example of identifying resource elements (e.g., subcarrier components or frequency domain components of resource elements) to be used for transmission and/or reception of a reference signal in a communication system with three possible numerologies, shown as 60 kHz, 30 kHz, and 15 kHz. For example, the communication system may be a sub-6 GHz communication system.

As shown by reference number 605, if the maximum system numerology (e.g., the highest system subcarrier spacing (SCS)) is being used for transmission (e.g., is being used as the transmitter numerology), then the reference signal may be transmitted on every subcarrier of the symbol(s) that carry the reference signal. Similarly, if the maximum system numerology is being used for reception (e.g., is being used as the receiver numerology), then the reference signal may be obtained on every subcarrier of the symbol(s) that carry the reference signal.

As shown by reference number 610, if the numerology being used for transmission is half of the maximum system numerology, then the reference signal may be transmitted on every other subcarrier of the symbol(s) that carry the reference signal. Similarly, if the numerology being used for reception is half of the maximum system numerology, then the reference signal may be obtained on every other subcarrier of the symbol(s) that carry the reference signal. In this case, the remaining subcarriers may not carry the reference signal and/or may carry zeroes for the reference signal.

As shown by reference number 615, if the numerology being used for transmission is one quarter of the maximum system numerology, then the reference signal may be transmitted on every fourth subcarrier of the symbol(s) that carry the reference signal. Similarly, if the numerology being used for reception is one quarter of the maximum system numerology, then the reference signal may be obtained on every fourth subcarrier of the symbol(s) that carry the reference signal. In this case, the remaining subcarriers may not carry the reference signal and/or may carry zeroes for the reference signal.

As indicated above, FIG. 6 is provided as an example. Other examples may differ from what is described with respect to FIG. 6. For example, a different number of possible system numerologies may be used, and/or different values of the system numerologies may be used. Additionally, or alternatively, a multiple of the maximum system numerology may be used for transmission (e.g., 60 kHz×N in example 600).

Figure 7:
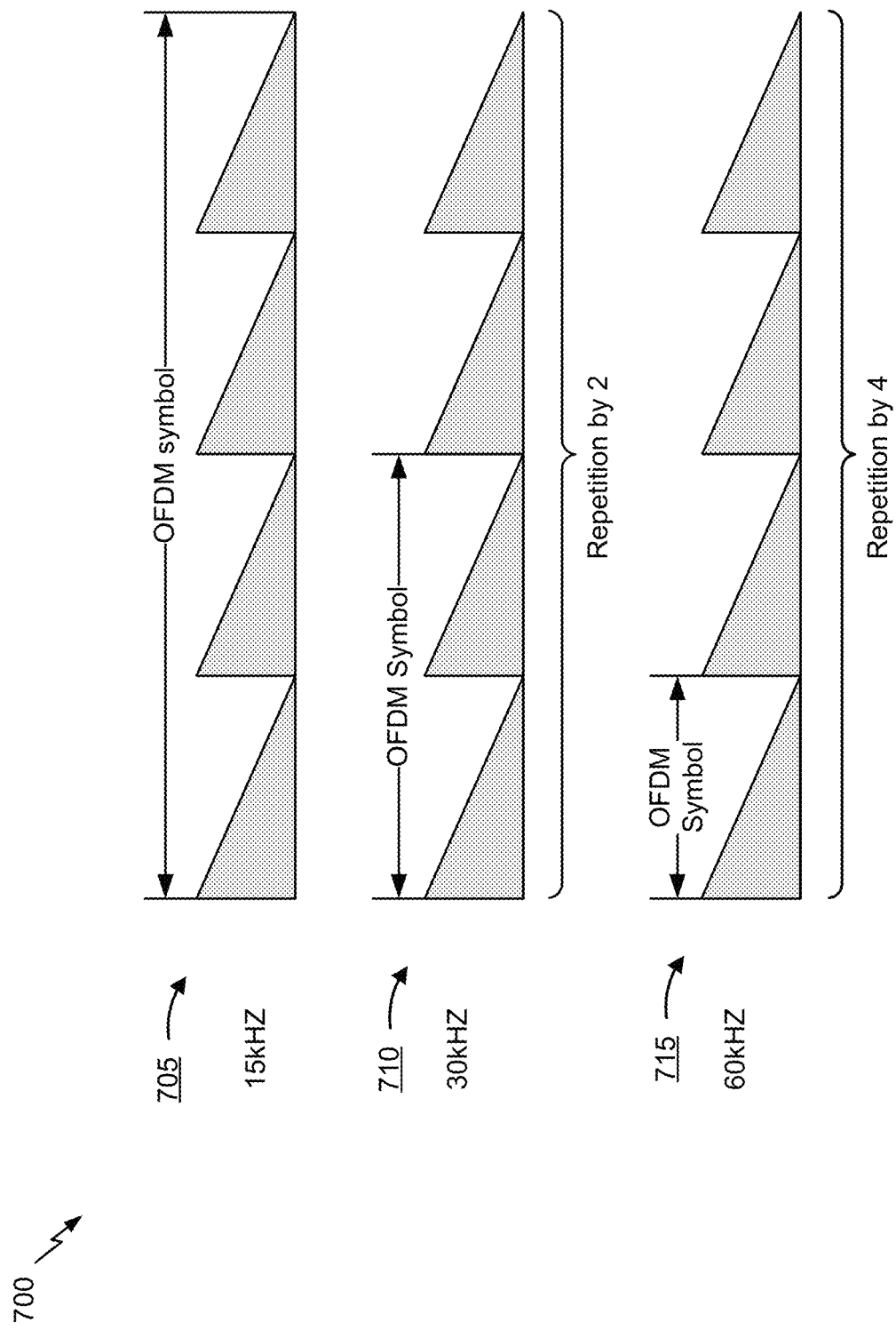

FIG. 7 is a diagram illustrating an example 700 of reference signal design for numerology ambiguity, in accordance with various aspects of the present disclosure.

FIG. 7 shows an example of identifying resource elements (e.g., symbol components or time domain components of resource elements) to be used for transmission and/or reception of a reference signal in a communication system with three possible numerologies, shown as 60 kHz, 30 kHz, and 15 kHz. For example, the communication system may be a sub-6 GHz communication system.

As shown in FIG. 7, the reference signal may include a number of repeated waveforms. In some aspects, the number of repeated waveforms may depend on the number of possible system numerologies. In example 700, with three possible system numerologies, the number of repeated waveforms is four (e.g., $2^{(3-1)}=4$). In some aspects, the length of a single waveform, that is repeated, may be the same as a symbol length of the maximum system numerology. Additionally, or alternatively, the number of symbols in which the single waveform is to be repeated may be equal to the numerology being used divided by the minimum system numerology.

For example, as shown by reference number 705, if the transmitter numerology is the same as the minimum system numerology (e.g., if the transmitter numerology divided by the minimum system numerology equals one), then the reference signal may be transmitted in one symbol (shown as OFDM symbol). Similarly, if the receiver numerology is the same as the minimum system numerology (e.g., if the receiver numerology divided by the minimum system numerology equals one), then the reference signal may be obtained in one symbol.

As shown by reference number 710, if the transmitter numerology divided by the minimum system numerology equals two, then the reference signal may be transmitted in two symbols (shown as repetition by 2). Similarly, if the receiver numerology divided by the minimum system numerology equals two, then the reference signal may be obtained in two symbols.

As shown by reference number 715, if the transmitter numerology divided by the minimum system numerology equals four, then the reference signal may be transmitted in four symbols (shown as repetition by 4). Similarly, if the receiver numerology divided by the minimum system numerology equals four, then the reference signal may be obtained in four symbols. As another example, if a fraction of the minimum system numerology is selected, such as 15 kHz/N, then the reference signal may be transmitted in four×N symbols.

As shown, due to different symbol lengths in different numerologies, this reference signal design results in an identical overall waveform for the reference signal regardless of numerology.

As indicated above, FIG. 7 is provided as an example. Other examples may differ from what is described with respect to FIG. 7. For example, a different number of possible system numerologies may be used, and/or different values of the system numerologies may be used. Additionally, or alternatively, a fraction of the minimum system numerology may be used for transmission (e.g., 15 kHz/N in example 700).

Figure 8:
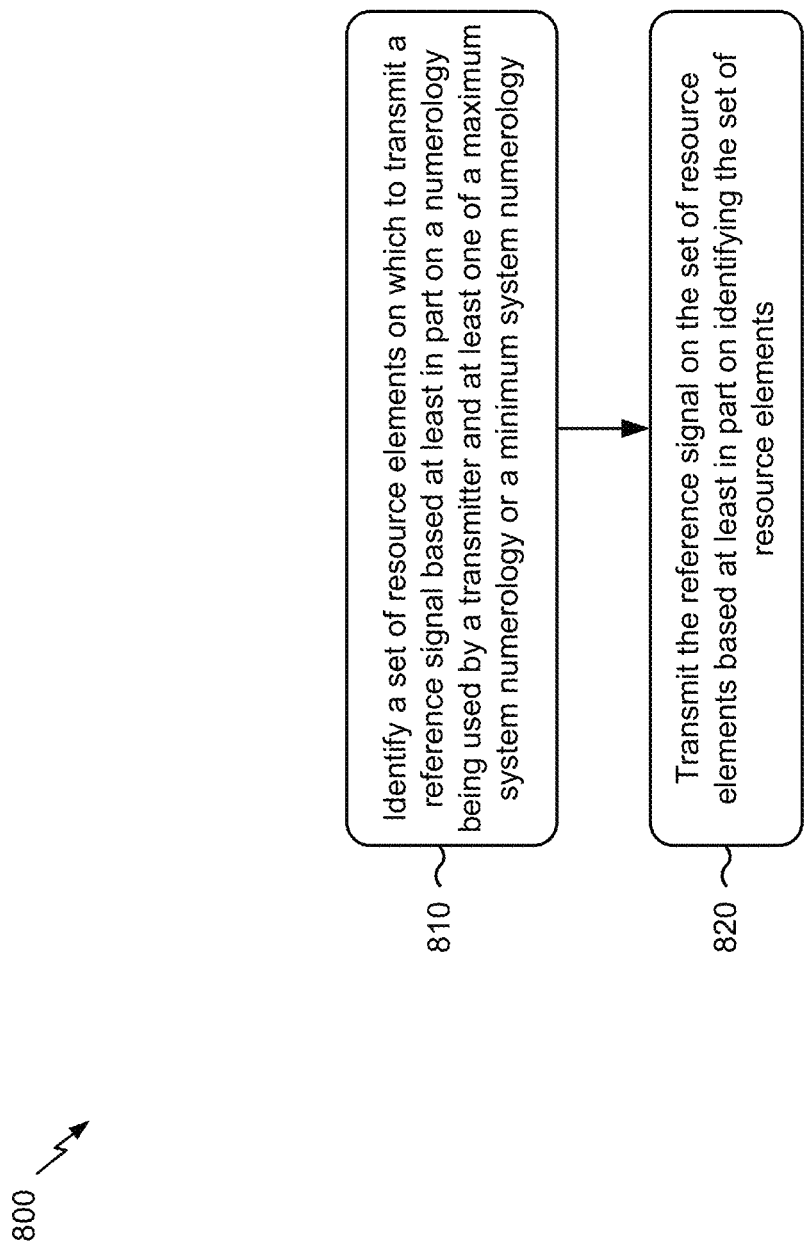

FIG. 8 is a diagram illustrating an example process 800 performed, for example, by a transmitter, in accordance with various aspects of the present disclosure. Example process 800 is an example where a transmitter (e.g., transmitter 505, base station 110, UE 120, and/or the like) performs operations associated with transmitting a reference signal designed for numerology ambiguity.

As shown in FIG. 8, in some aspects, process 800 may include identifying a set of resource elements on which to transmit a reference signal based at least in part on a numerology being used by the transmitter and at least one of a maximum system numerology or a minimum system numerology (block 810). For example, the transmitter (e.g., using controller/processor 240, controller/processor 280, and/or the like) may identify a set of resource elements on which to transmit a reference signal based at least in part on a numerology being used by the transmitter and at least one of a maximum system numerology or a minimum system numerology, as described above in connection with FIGS. 5-7.

As further shown in FIG. 8, in some aspects, process 800 may include transmitting the reference signal on the set of resource elements based at least in part on identifying the set of resource elements (block 820). For example, the transmitter (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the reference signal on the set of resource elements based at least in part on identifying the set of resource elements, as described above in connection with FIGS. 5-7.

Process 800 may include additional aspects, such as any single aspect or any combination of aspects described below and/or in connection with one or more other processes described elsewhere herein.

With respect to process 800, in a first aspect, a waveform of the reference signal is identical across all system numerologies.

With respect to process 800, in a second aspect, alone or in combination with the first aspect, the set of resource elements are identified based at least in part on a reference frequency that is identical across all system numerologies.

With respect to process 800, in a third aspect, alone or in combination with one or more of the first and second aspects, a waveform duration of a cyclic prefix of the reference signal is identical across all system numerologies.

With respect to process 800, in a fourth aspect, alone or in combination with one or more of the first through third aspects, the reference signal is transmitted on all subcarriers of a symbol based at least in part on a determination that the numerology being used by the transmitter and the maximum system numerology are a same numerology.

With respect to process 800, in a fifth aspect, alone or in combination with one or more of the first through fourth aspects, the reference signal is transmitted on fewer than all subcarriers of a symbol based at least in part on a determination that the numerology being used by the transmitter is different from the maximum system numerology.

With respect to process 800, in a sixth aspect, alone or in combination with one or more of the first through fifth aspects, the reference signal is transmitted on a set of subcarriers determined based at least in part on a relationship between the numerology being used by the transmitter and the maximum system numerology.

With respect to process 800, in a seventh aspect, alone or in combination with one or more of the first through sixth aspects, the reference signal is transmitted on a set of symbols determined based at least in part on a relationship between the numerology being used by the transmitter and the minimum system numerology.

With respect to process 800, in an eighth aspect, alone or in combination with one or more of the first through seventh aspects, the reference signal is a waveform repeated across a number of symbols, wherein the number of symbols is determined based at least in part on a relationship between the numerology being used by the transmitter and the minimum system numerology.

With respect to process 800, in a ninth aspect, alone or in combination with one or more of the first through eighth aspects, the set of resource elements are identified based at least in part on a multiple of the maximum system numerology.

With respect to process 800, in a tenth aspect, alone or in combination with one or more of the first through ninth aspects, the set of resource elements are identified based at least in part on a fraction of the minimum system numerology.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a receiver, in accordance with various aspects of the present disclosure. Example process 900 is an example where a receiver (e.g., receiver 510, base station 110, UE 120, and/or the like) performs operations associated with receiving a reference signal designed for numerology ambiguity.

As shown in FIG. 9, in some aspects, process 900 may include identifying a set of resource elements from which to obtain a reference signal based at least in part on a numerology being used by the receiver and at least one of a maximum system numerology or a minimum system numerology (block 910). For example, the receiver (e.g., using controller/processor 240, controller/processor 280, and/or the like) may identify a set of resource elements from which to obtain a reference signal based at least in part on a numerology being used by the receiver and at least one of a maximum system numerology or a minimum system numerology, as described above in connection with FIGS. 5-7.

As further shown in FIG. 9, in some aspects, process 900 may include obtaining the reference signal from the set of resource elements based at least in part on identifying the set of resource elements (block 920). For example, the receiver (e.g., using antenna 234, DEMOD 232, MIMO detector 236, receive processor 238, controller/processor 240, antenna 252, DEMOD 254, MIMO detector 256, receive processor 258, controller/processor 280, and/or the like) may obtain the reference signal from the set of resource elements based at least in part on identifying the set of resource elements, as described above in connection with FIGS. 5-7.

Process 900 may include additional aspects, such as any single aspect or any combination of aspects described below and/or in connection with one or more other processes described elsewhere herein.

With respect to process 900, in a first aspect, a waveform of the reference signal is identical across all system numerologies.

With respect to process 900, in a second aspect, alone or in combination with the first aspect, the set of resource elements are identified based at least in part on a reference frequency that is identical across all system numerologies.

With respect to process 900, in a third aspect, alone or in combination with one or more of the first and second aspects, a waveform duration of a cyclic prefix of the reference signal is identical across all system numerologies.

With respect to process 900, in a fourth aspect, alone or in combination with one or more of the first through third aspects, the reference signal is obtained on all subcarriers of a symbol based at least in part on a determination that the numerology being used by the receiver and the maximum system numerology are a same numerology.

With respect to process 900, in a fifth aspect, alone or in combination with one or more of the first through fourth aspects, the reference signal is obtained on fewer than all subcarriers of a symbol based at least in part on a determination that the numerology being used by the receiver is different from the maximum system numerology.

With respect to process 900, in a sixth aspect, alone or in combination with one or more of the first through fifth aspects, the reference signal is obtained on a set of subcarriers determined based at least in part on a relationship between the numerology being used by the receiver and the maximum system numerology.

With respect to process 900, in a seventh aspect, alone or in combination with one or more of the first through sixth aspects, the reference signal is obtained on a set of symbols determined based at least in part on a relationship between the numerology being used by the receiver and the minimum system numerology.

With respect to process 900, in an eighth aspect, alone or in combination with one or more of the first through seventh aspects, the reference signal is a waveform repeated across a number of symbols, wherein the number of symbols is determined based at least in part on a relationship between the numerology being used by the receiver and the minimum system numerology.

With respect to process 900, in a ninth aspect, alone or in combination with one or more of the first through eighth aspects, the set of resource elements are identified based at least in part on a multiple of the maximum system numerology.

With respect to process 900, in a tenth aspect, alone or in combination with one or more of the first through ninth aspects, the set of resource elements are identified based at least in part on a fraction of the minimum system numerology.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 00 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter, comprising:
    identifying a set of resource elements on which to transmit a reference signal based at least in part on a numerology being used by the transmitter and at least one of a maximum system numerology or a minimum system numerology, wherein the reference signal includes a number of repetitions of a same waveform, wherein the number of repetitions is based on $2^{(m-1)}$ wherein m is equal to a number of possible system numerologies, wherein m is a natural number, wherein the maximum system numerology is a maximum numerology supported by a communication mode with which one or more of the transmitter or a receiver is operating, and wherein the minimum system numerology is a minimum numerology supported by the communication mode; and
    transmitting the reference signal on the set of resource elements based at least in part on identifying the set of resource elements.

2. The method of claim 1, wherein an overall waveform of the reference signal is identical across the possible system numerologies.

3. The method of claim 1, wherein the set of resource elements are identified based at least in part on a reference frequency that is identical across the possible system numerologies.

4. The method of claim 1, wherein a waveform duration of a cyclic prefix of the reference signal is identical across the possible system numerologies.

5. The method of claim 1, wherein the reference signal is transmitted on all subcarriers of a symbol based at least in part on a determination that the numerology being used by the transmitter and the maximum system numerology are a same numerology.

6. The method of claim 1, wherein the reference signal is transmitted on fewer than all subcarriers of a symbol based at least in part on a determination that the numerology being used by the transmitter is different from the maximum system numerology.

7. The method of claim 1, wherein the reference signal is transmitted on a set of subcarriers determined based at least in part on a relationship between the numerology being used by the transmitter and the maximum system numerology.

8. The method of claim 1, wherein the reference signal is transmitted on a set of symbols determined based at least in part on a relationship between the numerology being used by the transmitter and the minimum system numerology.

9. The method of claim 1, wherein the reference signal is repeated across a number of symbols, and wherein the number of symbols is determined based at least in part on a relationship between the numerology being used by the transmitter and the minimum system numerology.

10. The method of claim 1, wherein the set of resource elements are identified based at least in part on a multiple of the maximum system numerology.

11. The method of claim 1, wherein the set of resource elements are identified based at least in part on a fraction of the minimum system numerology.

12. A method of wireless communication performed by a receiver, comprising:
    identifying a set of resource elements from which to obtain a reference signal based at least in part on a numerology being used by the receiver and at least one of a maximum system numerology or a minimum system numerology, wherein the reference signal includes a number of repetitions of a same waveform, wherein the number of repetitions is based on $2^{(m-1)}$, wherein m is equal to a number of possible system numerologies, wherein m is a natural number, wherein the maximum system numerology is a maximum numerology supported by a communication mode with which one or more of a transmitter or the receiver is operating, and wherein the minimum system numerology is a minimum numerology supported by the communication mode; and
    obtaining the reference signal from the set of resource elements based at least in part on identifying the set of resource elements.

13. The method of claim 12, wherein an overall waveform of the reference signal is identical across the possible system numerologies.

14. The method of claim 12, wherein the set of resource elements are identified based at least in part on a reference frequency that is identical across the possible system numerologies.

15. The method of claim 12, wherein a waveform duration of a cyclic prefix of the reference signal is identical across the possible system numerologies.

16. The method of claim 12, wherein the reference signal is obtained on all subcarriers of a symbol based at least in part on a determination that the numerology being used by the receiver and the maximum system numerology are a same numerology.

17. The method of claim 12, wherein the reference signal is obtained on fewer than all subcarriers of a symbol based at least in part on a determination that the numerology being used by the receiver is different from the maximum system numerology.

18. The method of claim 12, wherein the reference signal is obtained on a set of subcarriers determined based at least in part on a relationship between the numerology being used by the receiver and the maximum system numerology.

19. The method of claim 12, wherein the reference signal is obtained on a set of symbols determined based at least in part on a relationship between the numerology being used by the receiver and the minimum system numerology.

20. The method of claim 12, wherein the reference signal is repeated across a number of symbols, and wherein the number of symbols is determined based at least in part on a relationship between the numerology being used by the receiver and the minimum system numerology.

21. The method of claim 12, wherein the set of resource elements are identified based at least in part on a multiple of the maximum system numerology.

22. The method of claim 12, wherein the set of resource elements are identified based at least in part on a fraction of the minimum system numerology.

23. A transmitter for wireless communication, comprising:
  a memory; and
  one or more processors operatively coupled to the memory, the memory and the one or more processors configured to:
    identify a set of resource elements on which to transmit a reference signal based at least in part on a numerology being used by the transmitter and at least one of a maximum system numerology or a minimum system numerology, wherein the reference signal includes a number of repetitions of a same waveform, wherein the number of repetitions is based on $2^{(m-1)}$, wherein m is equal to a number of possible system numerologies, wherein m is a natural number, wherein the maximum system numerology is a maximum numerology supported by a communication mode with which one or more of the transmitter or a receiver is operating, and wherein the minimum system numerology is a minimum numerology supported by the communication mode; and
    transmit the reference signal on the set of resource elements based at least in part on identifying the set of resource elements.

24. The transmitter of claim 23, wherein at least one of an overall waveform of the reference signal or a waveform duration of a cyclic prefix of the reference signal is identical across the possible system numerologies.

25. The transmitter of claim 23, wherein the reference signal is transmitted on all subcarriers of a symbol based at least in part on a determination that the numerology being used by the transmitter and the maximum system numerology are a same numerology, or wherein the reference signal is transmitted on fewer than all subcarriers of a symbol based at least in part on a determination that the numerology being used by the transmitter is different from the maximum system numerology.

26. The transmitter of claim 23, wherein the reference signal is transmitted on a set of subcarriers determined based at least in part on a relationship between the numerology being used by the transmitter and the maximum system numerology, or wherein the reference signal is transmitted on a set of symbols determined based at least in part on a relationship between the numerology being used by the transmitter and the minimum system numerology.

27. A receiver for wireless communication, comprising:
  a memory; and
  one or more processors operatively coupled to the memory, the memory and the one or more processors configured to:
    identify a set of resource elements from which to obtain a reference signal based at least in part on a numerology being used by the receiver and at least one of a maximum system numerology or a minimum system numerology, wherein the reference signal includes a number of repetitions of a same waveform, wherein the number of repetitions is based on $2^{(m-1)}$, wherein m is equal to a number of possible system numerologies, wherein m is a natural number, wherein the maximum system numerology is a maximum numerology supported by a communication mode with which one or more of a transmitter or the receiver is operating, and wherein the minimum system numerology is a minimum numerology supported by the communication mode; and
    obtain the reference signal from the set of resource elements based at least in part on identifying the set of resource elements.

28. The receiver of claim 27, wherein at least one of an overall waveform of the reference signal or a waveform duration of a cyclic prefix of the reference signal is identical across the possible system numerologies.

29. The receiver of claim 27, wherein the reference signal is obtained on all subcarriers of a symbol based at least in part on a determination that the numerology being used by the receiver and the maximum system numerology are a same numerology, or wherein the reference signal is obtained on fewer than all subcarriers of a symbol based at least in part on a determination that the numerology being used by the receiver is different from the maximum system numerology.

30. The receiver of claim 27, wherein the reference signal is obtained on a set of subcarriers determined based at least in part on a relationship between the numerology being used by the receiver and the maximum system numerology, or wherein the reference signal is obtained on a set of symbols determined based at least in part on a relationship between the numerology being used by the receiver and the minimum system numerology.

* * * * *